(12) United States Patent
Dill

(10) Patent No.: US 11,987,162 B2
(45) Date of Patent: May 21, 2024

(54) ANTI-ROLLOVER TRAILER

(71) Applicant: DCB Trailer Design, LLC, Hawley, TX (US)

(72) Inventor: Blake Dill, Hawley, TX (US)

(73) Assignee: DCB Trailer Design, LLC, Hawley, TX (US)

( * ) Notice: Subject to any disclaimer, the term of this patent is extended or adjusted under 35 U.S.C. 154(b) by 369 days.

(21) Appl. No.: 17/572,609

(22) Filed: Jan. 10, 2022

(65) Prior Publication Data

US 2022/0126744 A1   Apr. 28, 2022

Related U.S. Application Data

(63) Continuation-in-part of application No. 16/554,085, filed on Aug. 28, 2019, now Pat. No. 11,241,991, which is a continuation-in-part of application No. 15/400,783, filed on Jan. 6, 2017, now Pat. No. 10,435,089.

(60) Provisional application No. 62/789,572, filed on Jan. 8, 2019.

(51) Int. Cl.
*B60P 3/22* (2006.01)
*B60P 3/24* (2006.01)
*B62D 53/08* (2006.01)
*B62D 53/06* (2006.01)

(52) U.S. Cl.
CPC .............. *B60P 3/2225* (2013.01); *B60P 3/24* (2013.01); *B62D 53/0871* (2013.01); *B60P 3/22* (2013.01); *B60P 3/2235* (2013.01); *B62D 53/061* (2013.01); *B62D 53/0842* (2013.01)

(58) Field of Classification Search
CPC ......... B60P 3/2225; B60P 3/24; B60P 3/2235; B60P 3/22; B62D 53/0871; B62D 53/0842; B62D 53/061
USPC ...................................... 296/182.1; 280/837
See application file for complete search history.

(56) References Cited

U.S. PATENT DOCUMENTS

| 2,339,303 | A | | 1/1944 | Franklin |
| 3,318,485 | A | * | 5/1967 | Lars ..................... B65D 88/548 |
| | | | | 222/626 |
| 3,880,438 | A | | 4/1975 | Klein |
| 3,883,148 | A | | 5/1975 | Miller |
| 4,331,342 | A | | 5/1982 | Lely |
| 5,593,070 | A | | 1/1997 | Steadman |
| 5,782,493 | A | | 7/1998 | Bolton et al. |
| 6,394,533 | B1 | | 5/2002 | Ladell et al. |

(Continued)

FOREIGN PATENT DOCUMENTS

| CN | 202806522 U | 3/2013 |
| JP | 2007099192 A | 4/2007 |
| JP | 2013184725 A | 9/2013 |

*Primary Examiner* — Amy R Weisberg
*Assistant Examiner* — Dana D Ivey
(74) *Attorney, Agent, or Firm* — Johnston IP Law, PLLC

(57) ABSTRACT

A tank trailer configured to lower an overall center of gravity. The trailer includes a tank, a wheel assembly, an upper body height and a trailer length. The tank includes a cavity contained within a lower body, an upper body, a transitioning body, a front end and a rear end when the cavity within the trailer is filled with a liquid fluid, the liquid fluid is evenly distributed along the trailer length of the trailer since a diameter of the lower body, the upper body and the transitioning body are equal. Other trailers are presented.

15 Claims, 8 Drawing Sheets

(56) References Cited

U.S. PATENT DOCUMENTS

| | | | |
|---|---|---|---|
| 8,523,232 B2 * | 9/2013 | DeLaRosa | B60P 3/221 |
| | | | 280/837 |
| 8,801,040 B2 | 8/2014 | Thomas et al. | |
| 10,435,089 B2 | 10/2019 | Dill | |
| 2016/0193950 A1 | 7/2016 | Kibler | |

* cited by examiner

ANTI-ROLLOVER TRAILER

CROSS-REFERENCE TO RELATED APPLICATION

This application is a continuation-in-part application of U.S. patent application Ser. No. 16/554,085, which was filed Aug. 28, 2019, and which is a continuation-in-part of U.S. patent application Ser. No. 15/400,783 (now U.S. Pat. No. 10,435,089; see also Supplemental Exam Certificate 96/000,325), filed on Jan. 6, 2017. U.S. patent application Ser. No. 16/554,085 claimed the benefit of U.S. Provisional Patent Application 62/789,572, filed on Jan. 8, 2019. In addition, U.S. patent application Ser. No. 16/737,866 is related as a continuation-in-part of U.S. patent application Ser. No. 16,554,085. All these applications are incorporated herein by reference for all purposes.

TECHNICAL FIELD

This application is directed, in general, to trailers, and more particularly to tank trailers having a low center of gravity.

BACKGROUND

The following discussion of the background is intended to facilitate an understanding of the present disclosure only. It should be appreciated that the discussion is not an acknowledgement or admission that any of the material referred to was part of the common general knowledge at the priority date of the application.

Truck trailers are used to transport many different types of cargos. In some instances, truck trailers are used to transport liquids, other fluids, or flowable materials. Tank trailers are used for this purpose that are substantially horizontally disposed.

SUMMARY

According to an illustrative embodiment, an anti-roll tank trailer for lowering an overall center of gravity of the tank trailer includes an upper body positioned at a front end of the trailer. The upper body has an upper body height and an upper body center of gravity. The tank trailer further includes a transitioning body connected to the upper body. The transitioning body is inclined relative to the upper body. The tank trailer also includes a lower body connected to the transitioning body. The lower body is positioned at a rear end of the trailer and has a lower body height less than the upper body height and a lower body center of gravity. The lower body center of gravity of the lower body lowers the overall center of gravity of the trailer and pushes the overall center of gravity towards the rear end of the trailer. Said another way, in an illustrative embodiment, it lowers the vertical center of gravity and moves the horizontal center of gravity along the center line towards the rear of the trailer. The upper body, the transitioning body and the lower body have a uniform diameter.

The tank trailer also includes a cavity extending through the upper body, the transitioning body and the lower body. The cavity includes an upper cavity in the upper body, a transitioning cavity in the transitioning body and a lower cavity in the lower body. The upper cavity, transitioning cavity and lower cavity are fluidly connected. The cavity further includes an upper cavity volume, a transitioning cavity volume and a lower cavity volume. The lower cavity volume is greater than the upper cavity volume. The tank trailer further includes a first portal for transitioning fluids to or from the cavity and a second portal positioned in the lower body for transitioning fluids to or from the cavity. The tank trailer also has a wheel assembly connected to the lower body and a kingpin assembly positioned proximate to the upper body, adjacent the front end. The kingpin assembly is configured to connect the tank trailer to a transport vehicle.

According to another illustrative embodiment, a tank trailer for lowering a center of gravity of the tank trailer when holding liquid fluids includes an upper body, a transition body, and a lower body. The upper body is at a front end of the trailer and has a longitudinal length, L1, and an upper body center of gravity. The lower body is at a rear end of the trailer and has a longitudinal length, L2, and a lower body center of gravity. The lengths are sized such that L2>L1. The lower body center of gravity is closer to a ground than the upper body center of gravity. The transitioning body is coupled to the lower body and the upper body, and the transitioning body is fluidly connected to the upper body and the lower body. The transitioning body is angled relative to the upper body and the lower body and is configured to transfer liquid entering the upper body to the lower body to fill a portion of the lower body before filling a portion of the upper body. The upper body has a diameter D1 (in lateral cross section). The transitioning body has a diameter D2 (in lateral cross section). The lower body has a diameter D3 (in lateral cross section). The diameters are sized such that D1=D2 and D2=D3 along a length of the trailer. The tank trailer ha an overall center of gravity, and the overall center of gravity is closer to the lower body center of gravity than the upper body center of gravity. In some embodiments, the overall center of gravity is also closer to the rear end of the trailer than the front end of the trailer. The tank trailer includes a kingpin assembly positioned beneath the upper body for attaching the trailer to a transport vehicle. Additional illustrative embodiments are presented herein.

DESCRIPTION OF THE DRAWINGS

Illustrative embodiments of the present disclosure are described in detail below with reference to the attached drawing figures, which are incorporated by reference herein and wherein.

DETAILED DESCRIPTION

Figure 1A:
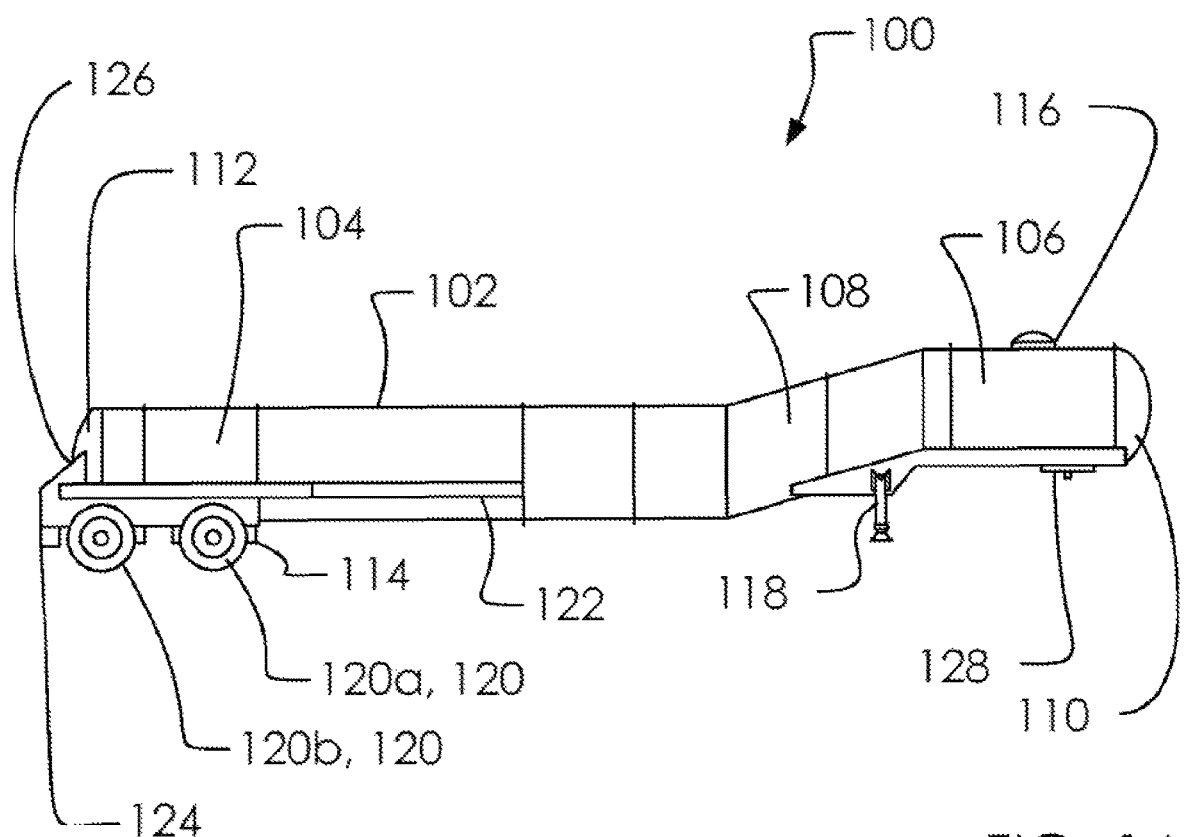
FIGS. 1A and 1B illustrate an elevated first side view of an illustrative embodiment of a tank trailer 100.

In the following detailed description of the illustrative embodiments, reference is made to the accompanying drawings that form a part hereof, and in which is shown, by way of illustration, specific embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the claims. Unless otherwise indicated, as used throughout this document, "or" does not require mutual exclusivity.

In considering the figures, the following parts list may be helpful: A trailer 100, a tank 102, a lower body 104, an upper body 106, a transitioning body 108, a front end 110, a rear end 112, a wheel assembly 114, a portal 116, one or more legs 118, a first leg 118a, a second leg 118b, a plurality of wheels 120, a first wheel 120a, a second wheel 120b, a rear wheel fender 122, a rear bumper 124, a drain portal 126, a kingpin assembly 128, an upper body height 130, a trailer length 132, an upper body ground clearance 134, a lower body height 136, a lower body length 138, a transitioning body length 140, an upper body length 142, a lower body ground clearance 144, an incline angle 146, a tank height 148, a tank ground clearance 150, a minimum height 152, a plurality of bands 202, a first support band 202a, a second support band 202b, a third support band 202c, a fourth support band 202d, a fifth support band 202e, a sixth support band 202f, a seventh support band 202g, a plurality of sections 206, a first section 206a, a second section 206b, a third section 206c, a fourth section 206d, a fifth section 206e, a sixth section 206f, a seventh section 206g, an eight section 206h, a ninth section 206k, a lower center of gravity 302, an upper center of gravity 304, an overall center of gravity 306, a cavity 400, a lower cavity 402, an upper cavity 404, a transitioning cavity 406, one or more fluids 408, a gas fluid 408a, a liquid fluid 408b, a lower fluid 410, an upper fluid 412, a transitioning fluid 414, a lower cavity volume 416, an upper cavity volume 418, a transitioning cavity volume 420, a width 600, a height 602, a height 604, a lateral center of gravity 606, a round cross-section 608, a diameter 610 and a vehicle 800.

According to an illustrative embodiment and with reference to the figures generally, a trailer 100 configured to lower an overall center of gravity 306. The trailer 100 includes a tank 102, a wheel assembly 114, an upper body height 130 and a trailer length 132. The tank 102 includes a cavity 400 contained within a lower body 104, an upper body 106, a transitioning body 108, a front end 110 and a rear end 112. The tank 102 includes a lower center of gravity 302, an upper center of gravity 304, and the overall center of gravity 306. The lower body 104 includes a lower body height 136, a lower body length 138, a lower body ground clearance 144, and the lower center of gravity 302. The upper body 106 includes an upper body length 142, an upper body ground clearance 134, the upper body height 130 and the upper center of gravity 304. The tank 102 includes the trailer length 132, a tank height 148 equal to the upper body height 130 of the upper body 106, and a tank ground clearance 150 equal to the lower body ground clearance 144. The transitioning body 108 includes a transitioning body length 140. The cavity 400 configured to contain one or more fluids 408. The lower body height 136 of the lower body 104 is lower than the upper body height 130 of the upper body 106. The transitioning body 108 connects the upper body 106 and the lower body 104. The upper body ground clearance 134 is a minimum height 152 to selectively mate with a vehicle 800. The transitioning body 108 is inclined to connect the upper body 106 and the lower body 104. The lower body 104 and the upper body 106 are substantially horizontal. The lower body 104, the upper body 106 and the transitioning body 108 each comprise a round cross-section 608 having a width 600. The width 600 of the lower body 104, the upper body 106 and the transitioning body 108 are equal. When the cavity 400 within the trailer 100 is full only with a liquid fluid 408b, the liquid fluid 408b is evenly distributed along the trailer length 132 of the trailer 100 since a diameter 610 of the lower body 104, the upper body 106 and the transitioning body 108 are equal.

The trailer 100 configured to lower the overall center of gravity 306. The trailer 100 includes the tank 102, the wheel assembly 114, the upper body height 130 and the trailer length 132. The tank 102 includes the cavity 400 contained within the lower body 104, the upper body 106, the transitioning body 108, the front end 110 and the rear end 112. The tank 102 includes the lower center of gravity 302, the upper center of gravity 304, and the overall center of gravity 306. The lower body 104 includes the lower body height 136, the lower body length 138, the lower body ground clearance 144, and the lower center of gravity 302. The upper body 106 includes the upper body length 142, the upper body ground clearance 134, the upper body height 130 and the upper center of gravity 304. The tank 102 includes the trailer length 132, the tank height 148 equal to the upper body height 130 of the upper body 106, and the tank ground clearance 150 equal to the lower body ground clearance 144. The transitioning body 108 includes the transitioning body length 140. The cavity 400 is configured to contain the one or more fluids 408. The lower body height 136 of the lower body 104 is lower than the upper body height 130 of the upper body 106. The transitioning body 108 connects the upper body 106 and the lower body 104. The upper body ground clearance 134 is the minimum height 152 to selectively mate with the vehicle 800. The transitioning body 108 is inclined to connect the upper body 106 and the lower body 104. The lower body 104 and the upper body 106 are substantially horizontal. When the cavity 400 within the trailer 100 is filled with the liquid fluid 408b, the liquid fluid 408b is evenly distributed along the trailer length 132 of the trailer 100 since the diameter 610 of the lower body 104, the upper body 106 and the transitioning body 108 are equal.

Figure 1B:
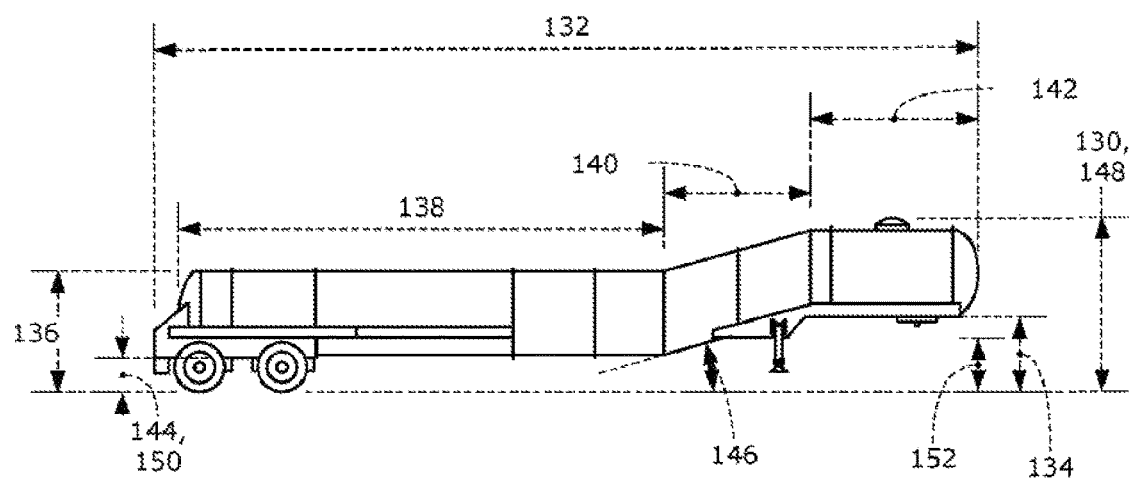

FIGS. 1A and 1B illustrate an elevated first side view of the illustrative embodiment of the tank trailer 100.

In one illustrative embodiment, the transitioning body 108 (having a higher center of gravity) which can be connected to the front end 110 can be positioned at the forward end of the trailer 100 to close off the cavity 400. The transitioning body 108 can be substantially cylindrically shaped and can be hollow to form a portion of the cavity 400 and can include a fill the portal 116 to allow fluid to be input into the cavity 400. The cavity 400 can extend for the entire length of the trailer 100 or have separate partitions.

The lower body 104 (having a lower center of gravity) can be a cylinder or other shape; wherein, the lower body 104 can include a portion of the cavity 400 and can be substantially horizontal.

The rear end 112 can include the drain portal 126 to drain the cavity 400, and the rear end 112 can be connected to the rear bumper 124.

In one illustrative embodiment, the lower body length 138 is greater than the upper body length 142, as illustrated. Accordingly, the volume within the tank 102 is substantially contained within the lower body 104.

In one illustrative embodiment, the upper body ground clearance 134 is the minimum height 152 to accommodate standard vehicles and to mate with a trailer hitch system of such transport vehicles (e.g., 800 in FIG. 8), as is known in the art.

In one illustrative embodiment, the lower body 104 can be configured to minimize the lower body ground clearance 144 to the fullest extent possible while ensuring the tank 102 passes all safety codes and government requirements for the lower body ground clearance 144. Accordingly, the trailer 100 is configured to attach to standard vehicles and pass safety standards while lowering its overall mass, as discussed herein.

Figure 2A:
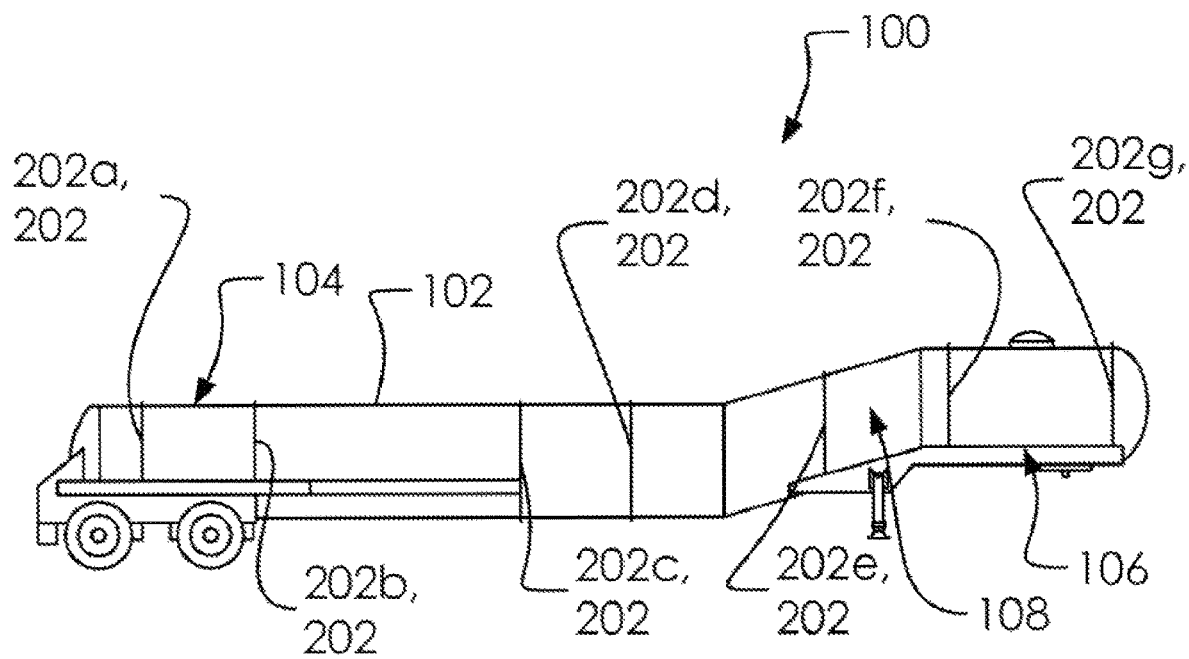
FIGS. 2A and 2B illustrate an elevated first side view of the trailer 100.
Figure 2B:
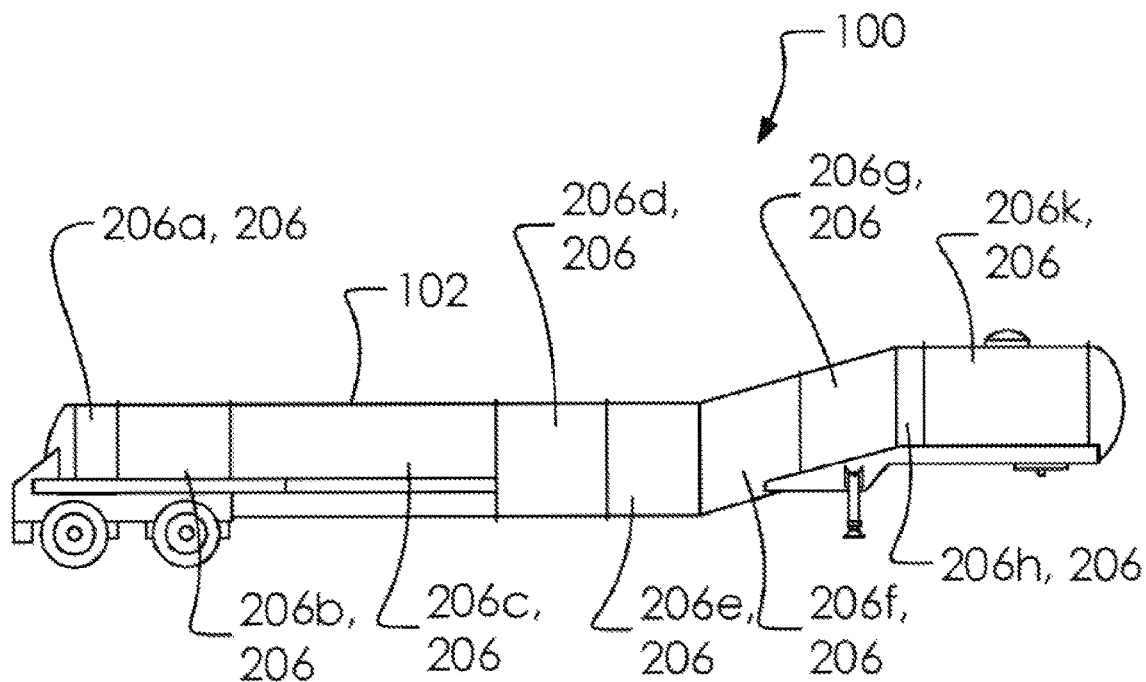

FIGS. 2A and 2B again illustrate an elevated first side view of the illustrative tank trailer 100.

The trailer 100 may include the plurality of sections 206 which may be integrally formed or which may be individually formed and connected together. The plurality of sections 206 may contain the plurality of bands 202 which may extend around the periphery of the plurality of sections 206. Each of the plurality of sections 206 may be formed from metal, plastic, wood, FRP (or a combination) or other appropriate material.

Each of the above-mentioned the plurality of sections 206 can contain the plurality of bands 202 which can support the trailer 100.

Figure 3:
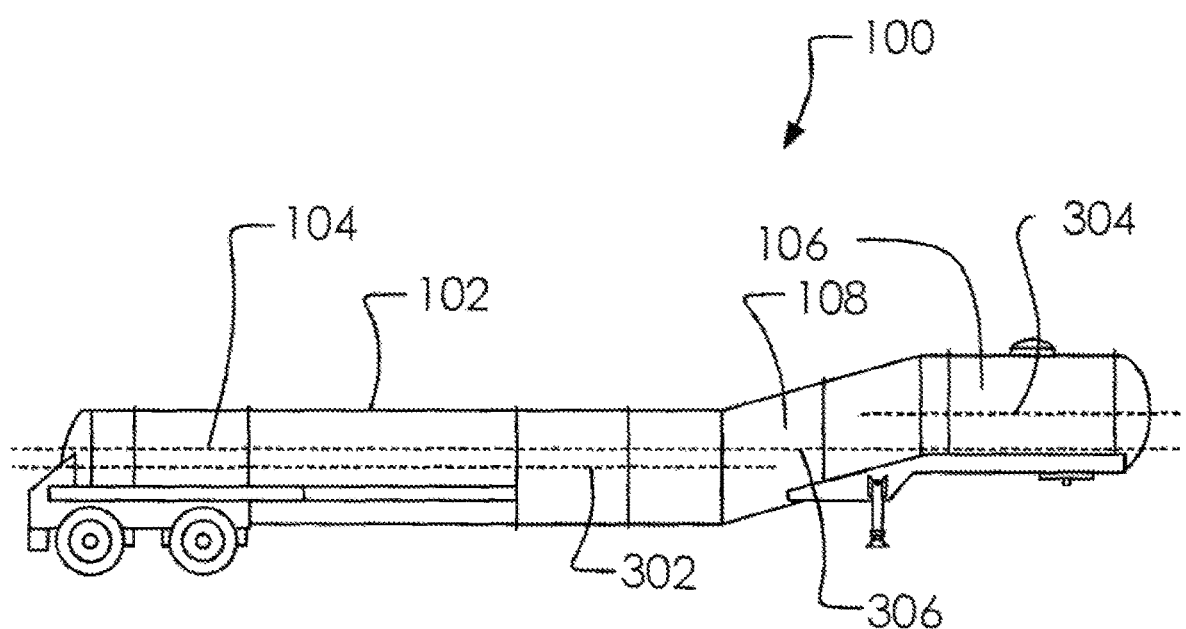
FIG. 3 illustrates an elevated first side view of the trailer 100.

FIG. 3 illustrates an elevated first side view of the illustrative embodiment of the tank trailer 100.

Figure 4A:
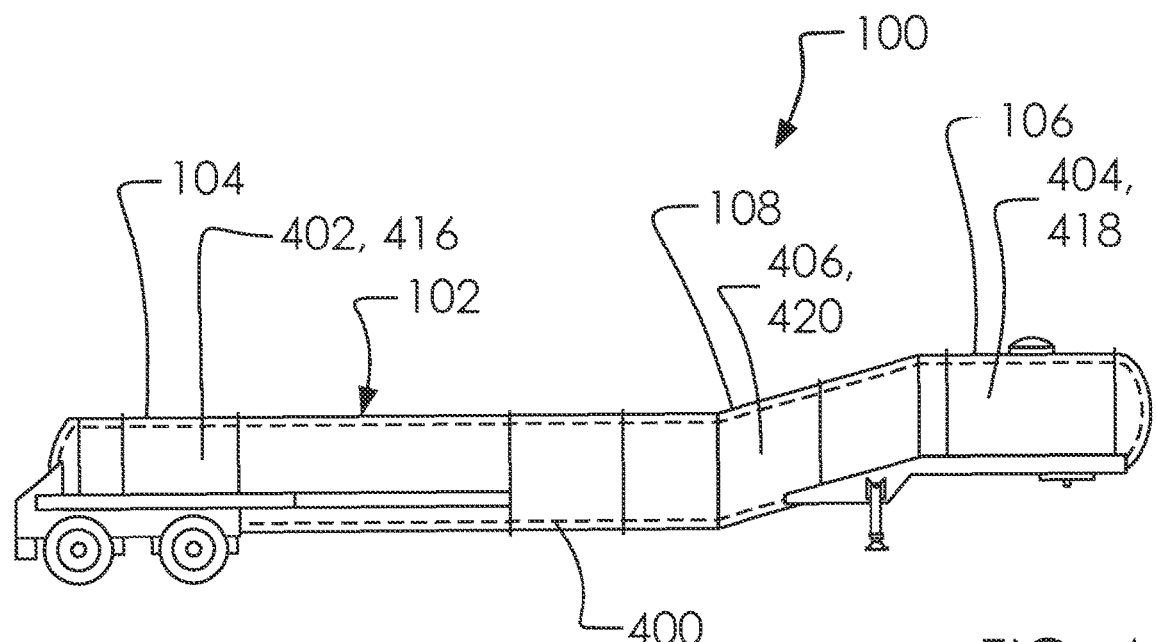
FIGS. 4A and 4B illustrate an elevated first side view of the trailer 100.
Figure 4B:
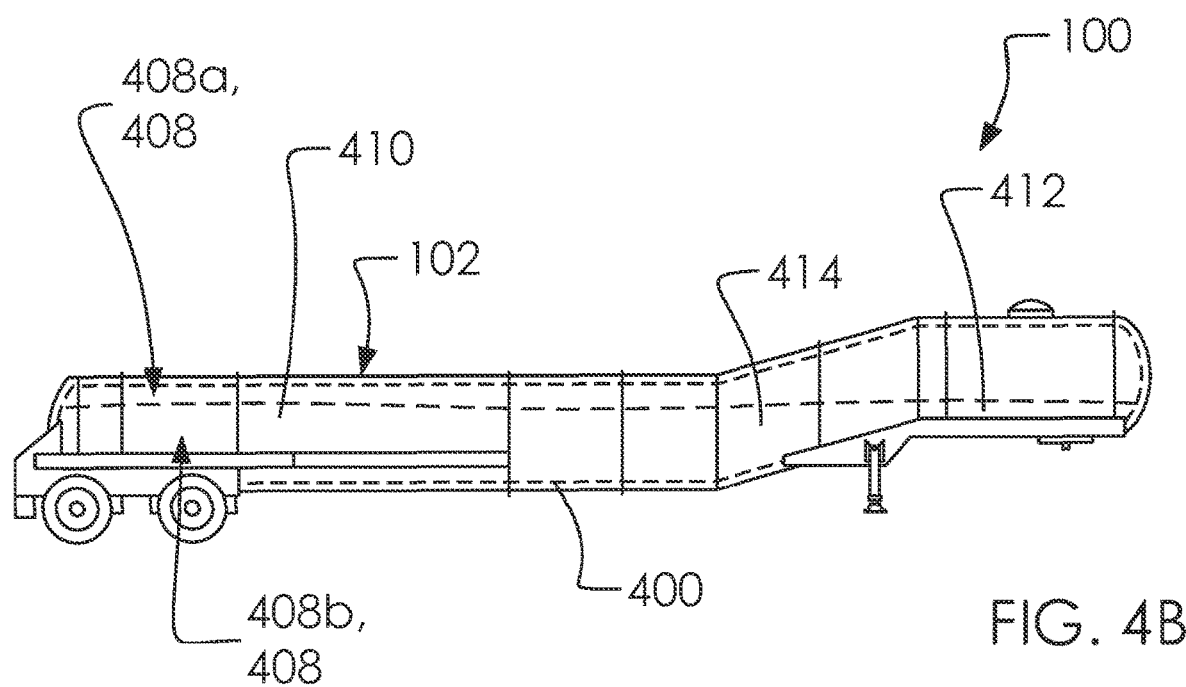

FIGS. 4A and 4B illustrate an elevated first side view of the illustrative embodiment of the tank trailer 100.

In one illustrative embodiment, the cavity 400 can contain the one or more fluids 408, as is known in the art.

One advantage of the trailer 100 over conventional tanks is the distribution of mass within the cavity 400. For example, in one illustrative embodiment, the gas fluid 408a fills an upper portion of the cavity 400 and the liquid fluid 408b fills a lower portion of the cavity 400 (as is to be expected due to the make-up of liquids and gasses). The liquid fluid 408b can settle within the cavity 400 to fill the lower cavity 402 before filling the upper cavity 404. Accordingly, the overall center of gravity 306 can be even lower and further back in the trailer 100 when the cavity 400 is partially filled with the gas fluid 408a and the liquid fluid 408b.

In another illustrative embodiment, the cavity 400 can be substantially filled with the liquid fluid 408b such that proportionately by volume the gas fluid 408a is substantially small. Wherein, the overall center of gravity 306 can be relatively low because the lower cavity 402 includes a much larger volume than the upper cavity 404.

Figure 5:
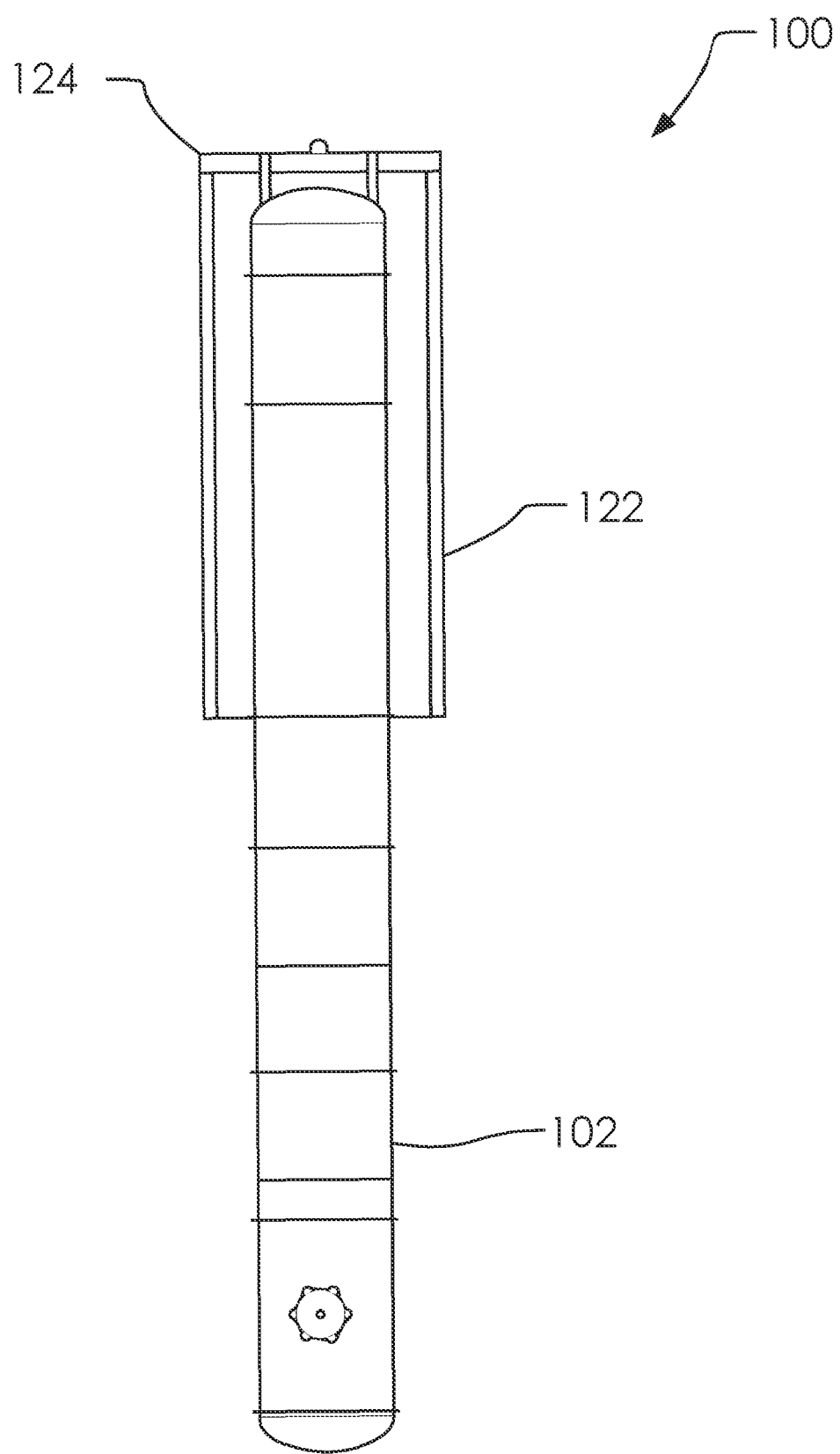
FIG. 5 illustrates plan view of the trailer 100.

FIG. 5 presents a schematic plan view of the illustrative embodiment of a tank trailer 100.

The rear wheel fender 122 can extend on opposing sides of the trailer 100 and can extend along the tank 102 and the rear end 112.

Figure 6:
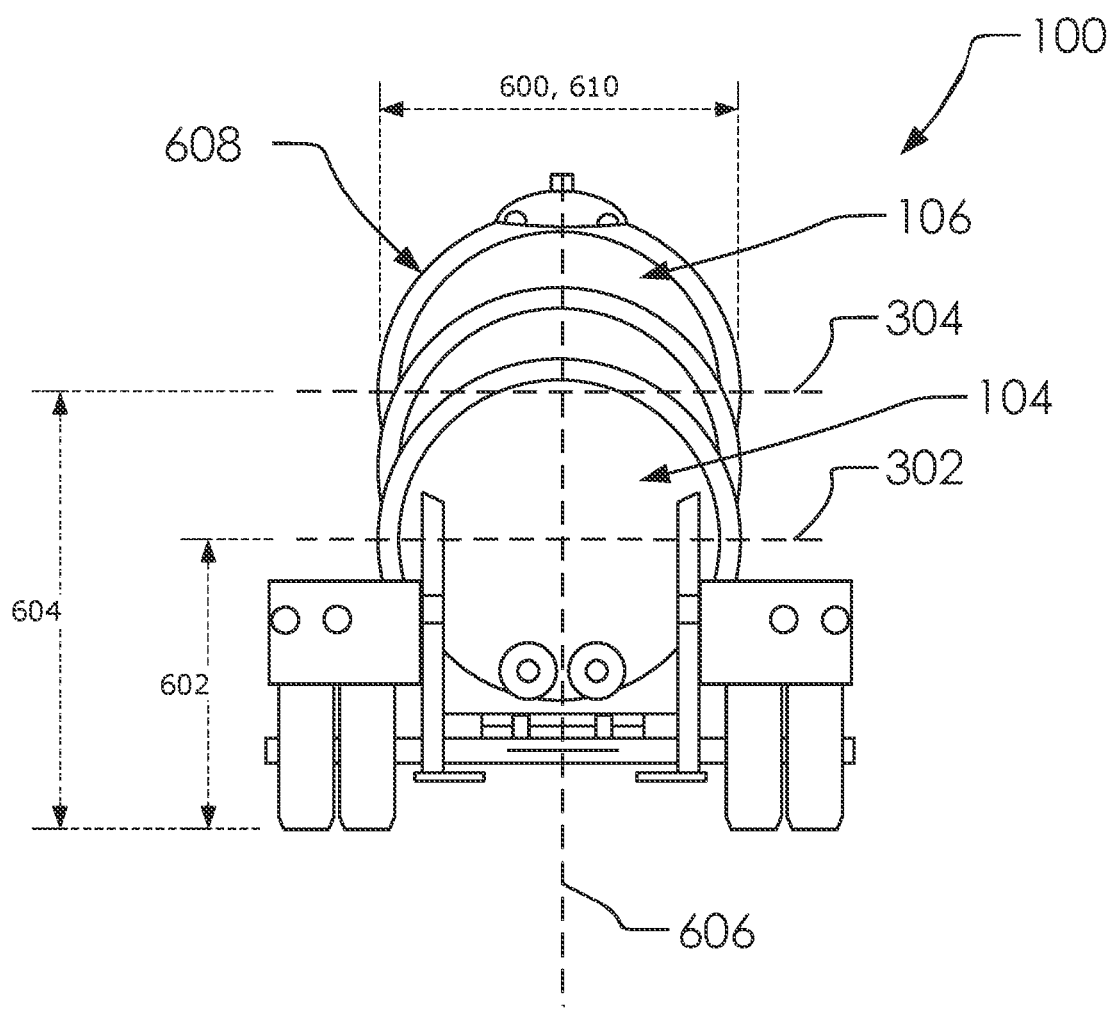
FIG. 6 illustrates an elevated rear view of the trailer 100.

FIG. 6 illustrates an elevated rear view of the illustrative embodiment of a tank trailer 100.

The plurality of sections 206 may have a round cross-section, oval cross-section, rectangular cross-section or a combination or other appropriate cross-section shapes.

Figure 7:
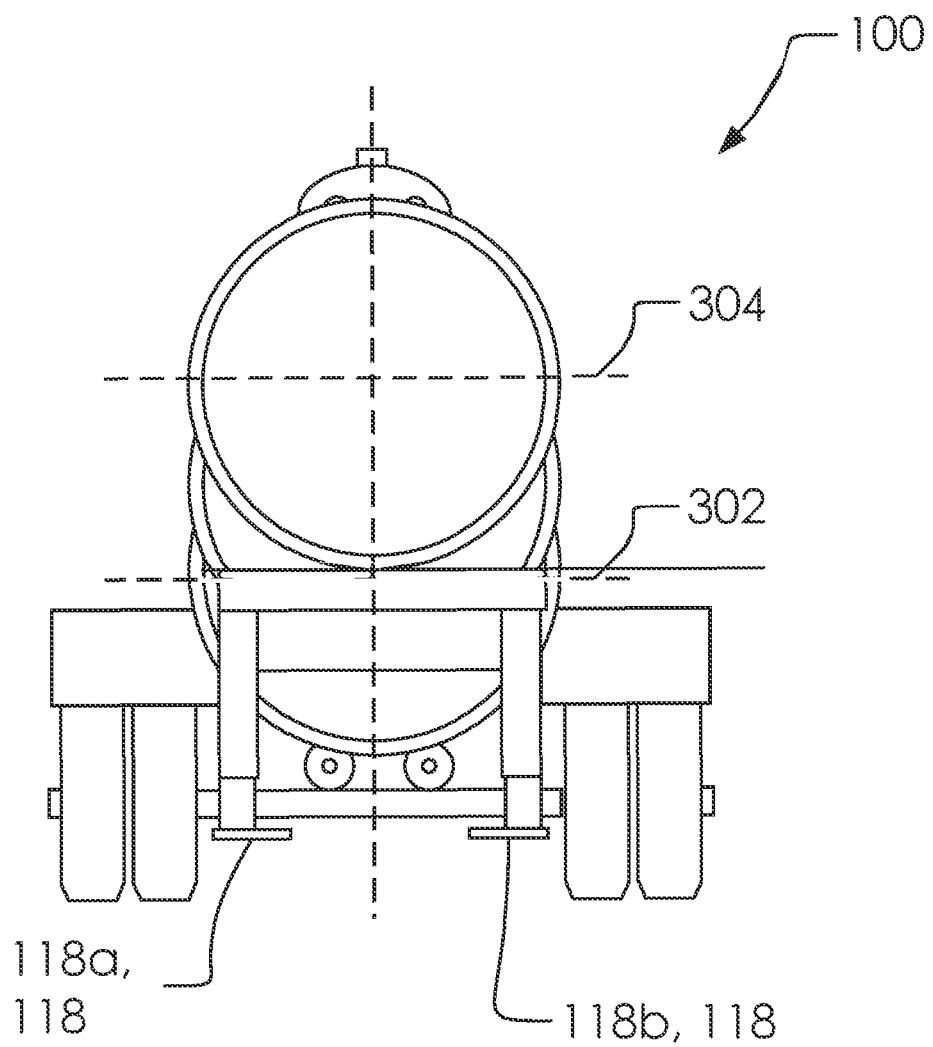
FIG. 7 illustrates an elevated front view of the trailer 100.

FIG. 7 illustrates an elevated front view of the illustrative embodiment of a tank trailer 100.

Figure 8:
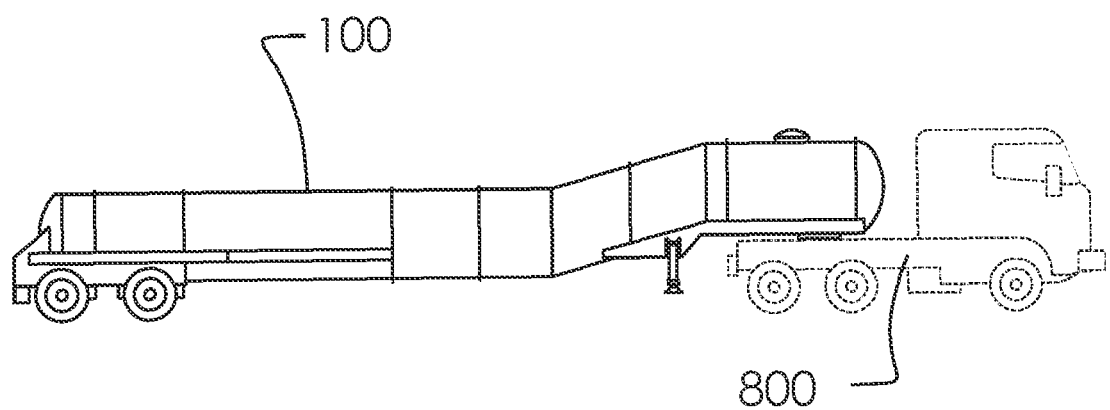
FIG. 8 illustrates an elevated first side view of the trailer 100.

FIG. 8 presents another elevated first side view of the illustrative embodiment of a tank trailer 100.

The vehicle 800 is provided for illustrative purposes.

Referring again generally to the figures, an illustrative embodiment of a tank trailer 100 is presented that is configured to lower the overall center of gravity 306. The trailer 100 includes the tank 102, the wheel assembly 114, the upper body height 130 and the trailer length 132. The tank 102 includes the cavity 400 contained within the lower body 104, the upper body 106, the transitioning body 108, the front end 110 and the rear end 112. The tank 102 includes the lower center of gravity 302, the upper center of gravity 304, and the overall center of gravity 306. The lower body 104 includes the lower body height 136, the lower body length 138, the lower body ground clearance 144, and the lower center of gravity 302. The upper body 106 includes the upper body length 142, the upper body ground clearance 134, the upper body height 130 and the upper center of gravity 304.

The tank 102 includes the trailer length 132, the tank height 148 equal to the upper body height 130 of the upper body 106, and the tank ground clearance 150 equal to the lower body ground clearance 144. The transitioning body 108 includes the transitioning body length 140. The cavity 400 is configured to contain the one or more fluids 408. The lower body height 136 of the lower body 104 can be lower than the upper body height 130 of the upper body 106. The transitioning body 108 connects the upper body 106 and the lower body 104. The upper body ground clearance 134 can be the minimum height 152 to selectively mate with the vehicle 800. The transitioning body 108 can be inclined to connect the upper body 106 and the lower body 104. The lower body 104 and the upper body 106 can be substantially horizontal. The lower body 104, the upper body 106 and the transitioning body 108 each comprise a round cross-section 608 having the width 600. The width 600 comprises a diameter 610 of the round cross-section 608. The diameter 610, D1, of the lower body 104, the upper body 106, D2, and the transitioning body 108, D3, can be equal, i.e., D1=D2=D3. When the cavity 400 within the trailer 100 is filled with the liquid fluid 408b, the liquid fluid 408b can be evenly distributed with respect to a lateral cross section, along the trailer length 132 of the trailer 100 since the diameter 610 of the lower body 104, the upper body 106 and the transitioning body 108 can be equal.

The one or more fluids 408 includes the gas fluid 408a and the liquid fluid 408b. The cavity 400 includes the lower cavity 402 in the lower body 104, the upper cavity 404 in the upper body 106, and the transitioning cavity 406 in the transitioning body 108. The liquid fluid 408b can be configured to fill portions of the lower cavity 402 before filing portions of the transitioning cavity 406. The tank 102 holds the liquid fluid 408b lower and further back from the upper cavity 404 by holding a greater percentage of the liquid fluid 408b, having a higher density than the gas fluid 408a, within the lower cavity 402 than a lesser percentage of the liquid fluid 408b within the upper cavity 404.

The lower cavity volume 416 can be larger than the upper cavity volume 418. The lower body length 138 of the lower body 104 can be longer than the upper body length 142 of the upper body 106. The lower cavity 402 includes the lower cavity volume 416. The upper cavity 404 includes the upper cavity volume 418. The transitioning cavity 406 includes the transitioning cavity volume 420.

The transitioning body 108 includes the incline angle 146. The incline angle 146 approximately (i.e., within 5 degrees) 15 degrees; in other words, the angle of incline can be between 10 and 20 degrees in some embodiments. Those skilled in the art upon reading this disclosure will understand that other angles may be used in other embodiments. The lower body 104 and the upper body 106 can be substantially horizontal.

Each of the lower body 104, the upper body 106 and the transitioning body 108 can be substantially cylindrical.

The round cross-section 608 for each of the lower body 104, the upper body 106 and the transitioning body 108 can be circular.

The lower body 104 can be at a rear portion of the tank 102. The transitioning body 108 can be at a forward portion of the tank 102 relative to the lower body 104.

The lower body 104 can be supported by the wheel assembly 114.

The wheel assembly 114 includes the plurality of wheels 120. The trailer 100 includes the one or more legs 118. The one or more legs 118 are configured to selectively extend and contract. The legs 118 support of the trailer 100 when extended and not coupled to a transport vehicle.

The tank 102 may include the plurality of bands 202 and the plurality of sections 206.

The cavity 400 can be sealed for selectively holding the one or more fluids 408.

The trailer 100 may further include the kingpin assembly 128. The kingpin assembly 128 of the trailer 100 can be mounted below the upper body 106.

In an illustrative embodiment, a tank trailer 100 for transporting fluids includes an upper body 106, a lower body 104, and a transitioning body 108. The transitioning body 108 connects the upper body 106 to the lower body 104. The transitioning body 108 is angled (see 146) relative to the upper body 106 and the lower body 104. An uppermost surface of the upper body 106 is higher above the ground than an uppermost surface of the lower body 104. Additionally, a lowermost surface of the upper body 106 is higher above the ground than a lowermost surface of the lower body 104. A length 138 of the lower body 104 is greater than a length 142 of the upper body 106. Moreover, the length 138 of the lower body 104 is greater than a combined length (140 and 142) of the upper body 106 and transitioning body 108.

In some aspects, the upper body 106, the transitioning body 108 and the lower body 104 have a substantially uniform lateral cross-section along a length of the trailer. The cross-section may be circular such that the upper body 106, the transitioning body 108 and the lower body 104 have substantially the same diameter along the length of the trailer. Likewise, the width of the upper body 106, transitioning body 108 and lower body 104 is substantially the same.

The lower body 104 has a lower body center of gravity 302, the upper body 106 has an upper body center of gravity 304, and the tank trailer 100 has an overall center of gravity 306. The overall center of gravity 306 is a combination of the upper body center of gravity 304 and the lower body center of gravity 302. The center of gravity of the lower body is lower to the ground than the center of gravity of the upper body. Likewise, the lower body 104 has a greater mass than the upper body 106 such that the lower body center of gravity affects the overall center of gravity greater than the upper body center of gravity. The lower body center of gravity causes the overall center of gravity to be positioned horizontally further back towards the rear end 112 of the trailer. Thus, the trailer's configuration causes the height of the overall center of gravity 306 to be reduced and, in some embodiments (such as when the lower body is longer than the accumulated length of the transition and upper bodies) the longitudinal position of the overall center of gravity to be pushed closer to the rear end of the trailer.

The tank trailer 100 further includes a fill portal 116 and a drain portal 126. In some aspects, the fill portal 116 will be located in the upper body 106 and the drain portal 126 will be located in the lower body 104. The fill portal 116 is configured to receive both liquid and gas fluids.

The tank trailer 100 further includes one or more legs 118 and one or more wheel assemblies 114. The one or more legs are operable to support the front end of the tank trailer when the tank trailer is disconnected from a transport vehicle 800. In some illustrative embodiments, the one or more legs are attached to the transitioning body. The one or more wheel assemblies provide support to the rear end of the trailer. The tank trailer may be supported by the one or more legs and the one or more wheel assemblies when the tank trailer is not connected to a transport truck.

The tank trailer 100 further includes a kingpin assembly 128 connected to the underside of the upper body. The kingpin assembly 128 is configured to connect the tank trailer to a transport truck. A load transfer acts through the kingpin assembly when the transport truck and the tank trailer are connected and the transport truck is in motion. In some aspects, minimizing the vertical distance between the height of the overall center of gravity and the kingpin assembly, through which the lateral load transfer occurs, and may reduce instability and trailer roll tendencies.

Those skilled in the art will understand that fluids, as broadly defined, may be introduced into the cavity 400 from one or more portals. In one illustrative embodiment, a first portal 116 is on a top portion and may be used to introduce or remove fluids, i.e., transition fluids in or out of the cavity. FIG. 1A shows the first portal 116 on the top portion, which in this case is the top of the upper body. In some embodiments, a second portal 126 is on a lower or bottom portion and may be used to introduce or remove fluids, i.e., transition fluids in or out of the cavity. In FIG. 1A, the second portal 126 is shown on the lower portion of the lower body. In some embodiments, both a first portal 116 and a second portal 126 are included for transitioning fluids in or out of the cavity. In one embodiment, the cavity 400 is loaded by applying vacuum pressure to the cavity 400 through the first portal 116 and loading/unloading are both done through the second portal 126. Other portals and techniques may be used as well.

In operation according to one illustrative embodiment, the tank trailer 100 configuration allows for an even further reduction in overall center of gravity 306 when carrying a liquid fluid. The tank trailer is configured such that when a liquid is added to the tank trailer, the liquid fills up a portion of the lower body before liquid is held in the upper body. The mass of the liquid is added to the mass of the lower body, thereby lowering the center of gravity of the lower body and, consequently, lowering the overall center of gravity. The mass of the liquid may also push the lateral position of the overall center of gravity towards the rear end of the trailer relative to the overall center of gravity of the trailer when the trailer is empty.

The description herein is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Various changes in the details of the illustrated operational methods are possible without departing from the scope of the following claims. Some illustrative embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

What is claimed:

1. An anti-roll tank trailer for lowering an overall center of gravity of the tank trailer, the tank trailer comprising:
    an upper body positioned at a front end of the trailer, the upper body having an upper body height and an upper body center of gravity;
    a transitioning body connected to the upper body, the transitioning body inclined relative to the upper body;
    a lower body connected to the transitioning body, the lower body positioned at a rear end of the trailer, the lower body having a lower body height less than the upper body height and a lower body center of gravity, wherein the center of gravity of the lower body lowers the overall center of gravity of the trailer;
    wherein the upper body, the transitioning body and the lower body have a uniform diameter;
    a cavity extending through the upper body, the transitioning body and the lower body, the cavity comprising an upper cavity in the upper body, a transitioning cavity in the transitioning body and a lower cavity in the lower body, wherein the upper cavity, transitioning cavity and lower cavity are fluidly connected, the cavity further comprising an upper cavity volume, a transitioning cavity volume and a lower cavity volume, wherein the lower cavity volume is greater than the upper cavity volume;
    a first portal for transitioning fluids in or out the cavity from a top portion;
    a second portal positioned in the lower body transitioning fluids in or out of the cavity from a lower portion;
    a wheel assembly connected to the lower body; and
    a kingpin assembly positioned proximate to the upper body, adjacent the front end, the kingpin assembly configured to connect the tank trailer to a transport vehicle.

2. The trailer of claim 1, wherein a length of the lower body is longer than a length of the transitioning body added to the length of the upper body and wherein the center of gravity of the lower body pushes the overall center of gravity towards the rear end of the trailer.

3. The trailer of claim 1, wherein the cavity is configured to fill a portion of the lower cavity with a liquid fluid before filling a portion of the transitional cavity and a portion of the upper cavity such that the overall center of gravity of the trailer is lowered when carrying a liquid fluid.

4. The trailer of claim 1, wherein in the transitioning body is inclined in the range of 10 to 20 degrees relative to the upper body.

5. The trailer of claim 1, wherein the lower body has a length greater than a length of the upper body.

6. The trailer of claim 1, further comprising a plurality of sections and a plurality of support bands that extend around a periphery of the plurality of sections.

7. The trailer of claim 1, further comprising one or more legs connected to the transitioning body, the legs configured to support the front end of the tank trailer when the trailer is not attached to a transport vehicle.

8. The trailer of claim 1, wherein the upper body has a ground clearance that is a minimum height to mate with trailer hitch systems of standard trucks.

9. A tank trailer for lowering a center of gravity of the tank trailer when holding liquid fluids, the tank trailer comprising:
    an upper body at a front end of the trailer, the upper body having a longitudinal length, L1, and an upper body center of gravity;
    a lower body at a rear end of the trailer, the lower body having a longitudinal length, L2, and a lower body center of gravity, wherein L2>L1, and wherein the lower body center of gravity is closer to a ground than the upper body center of gravity;
    a transitioning body coupled to the lower body and the upper body, wherein the transitioning body is fluidly connected to the upper body and the lower body, the transitioning body is angled relative to the upper body and the lower body, wherein the transitioning body is configured to transfer liquid entering the upper body to the lower body to fill a portion of the lower body before filling a portion of the upper body, and wherein the upper body has a diameter D1, the transitioning body has a diameter D2 and the lower body has a diameter D3, and wherein D1=D2 and D2=D3 along a length of the trailer;
    an overall center of gravity, wherein the overall center of gravity is closer to the lower body center of gravity than the upper body center of gravity, and wherein the overall center of gravity is closer to the rear end of the trailer than the front end of the trailer; and
    a kingpin assembly positioned beneath the upper body for attaching the trailer to a transport vehicle.

10. The tank trailer of claim 9, wherein the upper body has a height, h1, between an uppermost surface of the upper body and the ground, and a height, h2, between a lowermost surface of the upper body and the ground, wherein the lower body has a height, h3, between an uppermost surface of the lower body and the ground, and a height, h4, between a lowermost surface of the lower body and the ground, and wherein h1>h3, and wherein h4<h2.

11. The tank trailer of claim 9, further comprising a fill portal located in the upper body and a drain portal located in the lower body.

12. The tank trailer of claim 9, further comprising one or more legs attached to the transitioning body, the one or more legs operable to support the tank trailer when the tank trailer is disconnected from a transport vehicle.

13. The tank trailer of claim 9, further comprising one or more wheel assemblies connected to the lower body.

14. The tank trailer of claim 9, wherein the transitioning body is angled relative to the upper body in the range of 10 to 20 degrees.

15. The tank trailer of claim 9, wherein the transitioning body is angled relative to the upper body is 15 degrees.

\* \* \* \* \*